Oct. 18, 1949.　　　　A. VANG　　　　2,484,973
PROCESS OF WELDING CAN LOCK SEAMS WITH
HIGH-FREQUENCY CURRENT
Filed Oct. 12, 1943　　　　　　　　　　　　　　6 Sheets-Sheet 1

INVENTOR.
ALFRED VANG.

BY

ATTORNEY

Oct. 18, 1949.                    A. VANG                    2,484,973
                 PROCESS OF WELDING CAN LOCK SEAMS WITH
                         HIGH-FREQUENCY CURRENT
Filed Oct. 12, 1943                                  6 Sheets-Sheet 2

INVENTOR.
ALFRED VANG.
BY

ATTORNEY.

Oct. 18, 1949.        A. VANG        2,484,973
PROCESS OF WELDING CAN LOCK SEAMS WITH
HIGH-FREQUENCY CURRENT

Filed Oct. 12, 1943        6 Sheets-Sheet 3

INVENTOR.
ALFRED VANG.

BY *Peter M. Borry*

ATTORNEY.

Oct. 18, 1949.    A. VANG    2,484,973
PROCESS OF WELDING CAN LOCK SEAMS WITH
HIGH-FREQUENCY CURRENT

Filed Oct. 12, 1943    6 Sheets-Sheet 4

INVENTOR.
ALFRED VANG.
BY *Peter M. Bom*
ATTORNEY.

Oct. 18, 1949.　　　　A. VANG　　　　2,484,973
PROCESS OF WELDING CAN LOCK SEAMS WITH
HIGH-FREQUENCY CURRENT
Filed Oct. 12, 1943　　　　　　　　　　　　6 Sheets-Sheet 5

INVENTOR.
ALFRED VANG.
BY *Peter M. Bousy*
ATTORNEY.

Patented Oct. 18, 1949

2,484,973

UNITED STATES PATENT OFFICE 2,484,973

PROCESS OF WELDING CAN LOCK SEAMS WITH HIGH-FREQUENCY CURRENT

Alfred Vang, Newark, N. J., assignor to Continental Can Company, Inc., New York, N. Y., a corporation of New York Application October 12, 1943, Serial No. 505,922

7 Claims. (Cl. 219—10)

This invention relates to new and useful improvements in the manufacture of hermetically sealed containers for foods, etc., and has more particular reference to an improved process for accomplishing said manufacture.

The food canning industry has grown to tremendous proportions, doing millions of dollars' worth of business yearly. Its rapid growth in recent years may be traced to the fact that containers used in canning processes have been developed to a degree where their contents can be safely and effectively preserved. However, the canning processes are not yet perfect. Numerous inherent deficiencies and defects are present and their presence are known to the industry, but satisfactory solutions are lacking. As each of these problems is solved and put into use, additional impetus will be given to the natural growth of the industry.

In order to comprehend the instant invention and recognize the value of the improvements contained herein, it is advisable that a short résumé be given of the old processes, pointing out at the same time the deficiencies and defects thus referred to. The general process used in manufacturing cans consists essentially in stamping out blanks from sheet metal to form the can body and the ends of the can. The blanks for the can bodies are turned into hollow cylindrical forms and are permanently secured in this shape by side seaming the blanks with lap seams, lock seams or combination lock and lap seams. These seams usually are spot welded at the ends and sometimes at additional points to prevent them from opening. The side seams are next sealed with solder. Usually coated sheets of metal are used, with the coating acting as a lining for the can to prevent discoloration and deterioration of the contents of the can, and of the inner faces of the can itself. The ends of the can are lock seamed upon the can body.

An important deficiency in the can thus made, which up to this time has defied correction, is that discoloration and slight deterioration of the inner face of the can body and the adjacent contacting portions of the contents within the can do take place in spite of the lining which is of a material having a high resistance to discoloration and deterioration. The root of the trouble resides in the fact that when the ends of the lock seam are spot welded and the seam soldered, the heat incidental to these steps burn, weaken and deteriorate the lining, and this weakened condition is the cause of the deterioration referred to. When thus weakened, the lining may be readily attacked by the acids and alkali contained in the contents.

Another defect inherent in the construction of the can resides in the fact that the side seam is not absolutely tight prior to the application of the solder. For this reason a large amount of solder is required to make a tight side seam. This not only causes waste in so far as the solder is concerned, but is deficient in the fact that the solder is subsequently called upon to take up stresses on the side seam. If the side seam were extremely tight before the soldering operation, less solder would be needed, and the strains would be taken up by the material of the can body, instead of by the mass of solder.

This invention has for an important object the reduction or elimination of the slight discoloration and deterioration of the inside face of the can body and the adjacent contacting portions of the contents preserved in these cans. The invention particularly proposes reducing this discoloration and deterioration by preventing damage to the lining of the can body during the process of manufacturing the can. Thus, the invention contemplates an improved way of welding the side seam so that the lining will not be burned or heated excessively with resultant damage.

In the present processes for welding the side seams of cans made of weldable material, for example metallic material, electrodes are used both internally and externally of the can body, and the welding current actually runs through the material of the can body from one face to the other. This invention, however, contemplates welding the seam by using a pair of external electrodes, and causing the welding current to merely run within the skin and between external points of the seam, and in this way prevent damage to the interior lining of the can.

The invention further contemplates improvements in the welding process, whereby it is possible to produce the necessary welding with less heat. Heretofore, a standard 60 cycle current was used in the welding process. It is proposed that a high frequency current, for example, 7,000 cycles per second be used, or even ultra high frequency, instead of the low frequency now generally used. It is further proposed that the welding process make use of my high frequency discharge tube disclosed in the U. S. Patent No. 2,287,541 issued on June 23, 1942. This discharge tube is capable of handling the high and ultra-high frequency current now proposed to be used. A welding circuit may be used similar to that disclosed in my invention covered by U. S. Patent No. 2,287,544, issued on June 23, 1942. With this improved welding outfit it is possible to weld the side seams of the cans at the skin with so slight a rise in temperature internally, that the linings will not be damaged, and consequently be protected from attack by the acids and alkali contained in the canned products.

The basic principles of this invention may be embodied in any number of forms. Several modified forms are disclosed in this specification. These modifications distinguish from each other in suggesting numerous improvements within the general concept of this invention. In one of the forms, it is proposed that the welding step be performed simultaneously with the construction of the side seam, particularly at the moment when the side seam is under maximum pressure during the hammering operation. At this moment the side seam is tightly closed and it will readily be understood that if it is welded at this moment the finished can will have a tightly closed side seam. Consequently, less solder will be needed to finish said side seam. With this invention a stronger seam is produced at a lower cost, as there is a large saving of solder or silver solder.

In another form of the invention it is proposed that the improved welding take place in a step immediately subsequent to the construction of the side seam. Thus, it is possible with my improved welding to produce an improved seam which will eliminate the discoloration and deterioration previously referred to.

This application, furthermore, discloses numerous additional modified forms, the advantages of which will become clear as this specification proceeds.

With the above and other objects in view, this invention consists of the novel features of construction, combination, and arrangements of parts hereinafter fully described, claimed, and illustrated in the accompanying drawings, forming a part of this application, and in which similar characters of reference indicate corresponding parts in all views, and in which:

Figures 1, 2, 3, 4, 5:
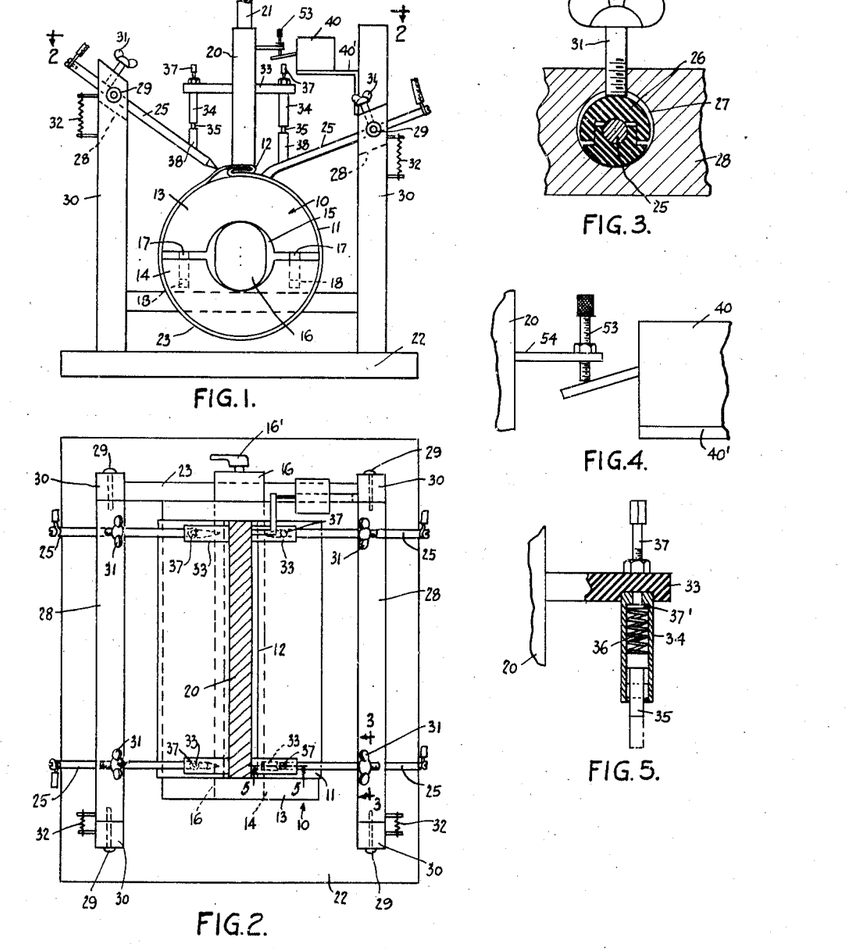
Figure 1 is an elevational view of an apparatus for side lock seaming a can body, in accordance with one form of this invention.
Figure 2 is a horizontal sectional view taken on the line 2—2 of Figure 1.
Figure 3 is a fragmentary enlarged sectional view taken on the line 3—3 of Figure 2.
Figure 4 is a fragmentary enlarged detailed view of a portion of Figure 1.
Figure 5 is a fragmentary enlarged vertical sectional view taken on the line 5—5 of Figure 2.

The apparatus for side lock seaming a can body, in accordance with this invention, as disclosed in Figures 1 to 6, includes an expandable cylindrical horn or internal die 10 for engaging and expanding in a can body 11 for pulling a loosely formed lock seam 12 of the can body closed. This lock seam 12 is formed in a prior operation by bending the side edges of the can body into hook-like portions, directed outwards and inwards, respectively, and which in Figure 1 are shown interengaged with each other. Incident to the production of the seam is the formation of an external open groove, shown most clearly in Figure 10 as at 12'. The die 10 is shown composed of a pair of die sections 13 and 14, having a central opening 15, in which an expanding cam 16 is positioned.

The die sections 13 and 14 are slidably connected by several pins 17, projecting from one of the sections and engaging corresponding openings 18 in the other of the sections. The cam 16 is shown of elliptical shape in cross section, and is so designed that when its major axis is vertical, the internal die 10 is fully expanded and holds the can body 11 in cylindrical formation. The cam 16 has one of its ends equipped with a lever 16' by which it may be turned. A narrow external hammer or die 20 is provided for hammering or pressing said lock seam 12 closed. This die 20 has a stem 21 by which it may be attached to the moving part of a press. The bottom section 14 of the die 10 is fixedly mounted at its back end on a strip 23, which is fixedly secured to a base 22. The base 22 may be rested upon the base section of a press.

Spot welding electrodes 25 are disposed externally of said can body 11 and to the sides of the narrow die 20, and also to the sides of said pressed closed lock seam 12. Each electrode 25 is supported in a sectional insulation collar 26, as shown especially in Figure 3. These collars 26 are mounted in openings 27 formed in support bars 28. These support bars 28 are pivotally mounted by the pintles 29 to standards 30, which are attached to the base 22. Wing clamp screws 31 threadedly engage through the support bars 28 and abut against said sectional collars 26 for clamping the electrodes 25 in selected extended positions. Springs 32 are connected between the pivotally mounted support bars 28 and the standards 30 for resiliently urging the support bars 28 in slightly turned positions in which the electrodes 25 are out of contact with the can body 11. The front end of one of the electrodes 25 is pointed and the front end of the other electrode 25 is blunt to facilitate the electric current breaking through the surface resistance of the seam to be welded. Preferably the blunt end should have an area 400 times that of the pointed end which can be 1/16" diameter or less.

The die 20 has lateral projections 33, upon which hollow stems 34 are fixedly mounted. These stems 34 support plungers 35. Springs 36 within the stems 34 resiliently urge the plungers 35 outwards. Adjustment screws 37 are threadedly mounted upon the projections 33 and extend into the stems 34 and have internal head portions 37' acting against the springs 36 for controlling the resiliency of the pegs 35. Each electrode is provided with an abutment 38 against which the pegs 35 strike when the die 20 is moved downwards. The pegs 35 indirectly engage the front ends of the electrodes 25 under suitable pressure against the can body 11, as shown in Figure 1.

Figure 6:
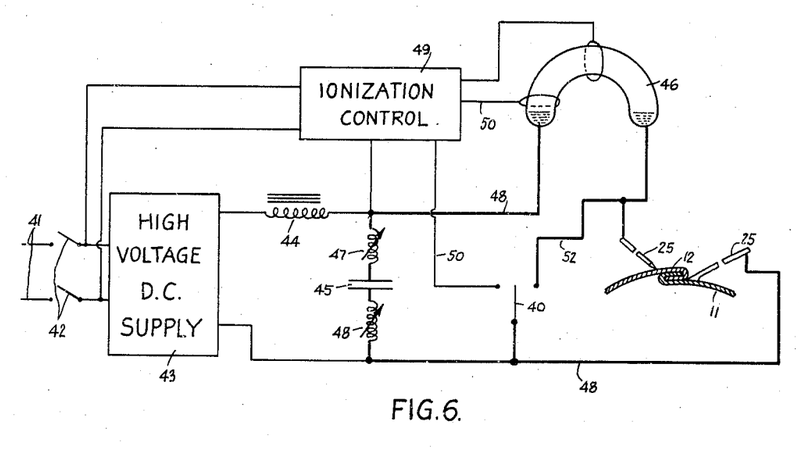
Figure 6 is a schematic wiring diagram of the device.

The electrodes 25 are connected with the means for supplying a welding current, which means includes a control switch 40. The details of said welding current supply means is shown in U. S. Patents No. 2,287,541 and 2,287,544 covering my inventions on a discharge tube, and electric welding of metals as stated supra. Briefly, as shown in Figure 6, the electric welding means disclosed includes a power supply circuit 41 controlled by the switch 42, feeding a high voltage direct current supply mechanism 43, from which the current potential flows through a choke coil 44 and a relative large capacitor 45, which accumulates a charge of electric energy sufficient for performing the weld.

The above mentioned accumulated energy may be discharged at will by means of a discharge tube 46, which controls the flow of the current to the electrodes 25. Variable inductances 47 and 48 are connected in series with the capacitor 45 and are adjustable to control the degree to which the heating action will develop at the electrodes 25. The current potential from the capacitor 45 will discharge through the circuit 48, which includes the said discharge tube 46. The discharge tube 46 is controlled by an ionization control apparatus 49, which is actuated by a control circuit 50, including the said switch 40. The ionization control apparatus 49 is set in operation by the switch 40, after the work seam 12 has been arranged between the said electrodes 25. The capacitor 45 is presumed to be already charged and prevented from discharging by lack of ionization of the tube 46, so that ionization of the tube 46 will cause sudden and substantially complete discharge of the capacitor 45 through the electrodes 25 and seam 12. A shunt lead 52 across the electrode 25 is included, and this circuit is a protective device to minimize the danger of shock to the operator. It is intended that the double throw switch 40 be closed with the lead 52 at all times, shunting the electrodes 25, except during the welding operation, when the switch 40 is closed with the ionization control lead of the circuit 50. The front ends of said electrodes 25 should be as close together as is possible without touching or short circuiting.

Figure 8:
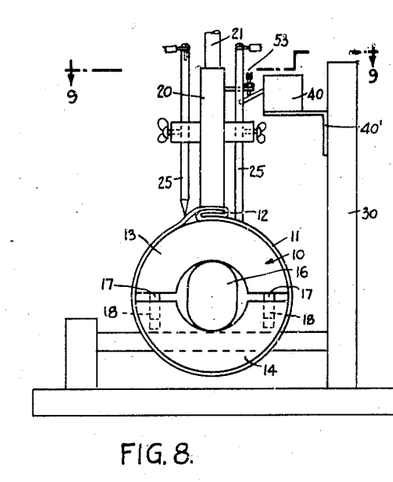
Figure 8 is an elevational view of an apparatus for side seaming a can body in accordance with another form of this invention.
Figure 9:
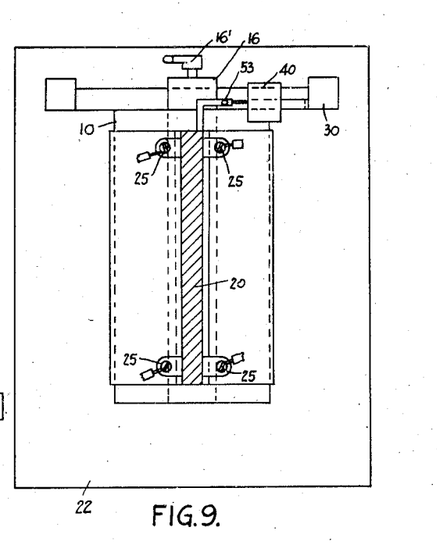
Figure 9 is a horizontal sectional view taken on the line 9—9 of Figure 8.

As shown in Figures 8 and 9 the switch 40 is operated by a control screw 53 mounted on a support 54, which is mounted on the external die 20, as shown especially in Figure 4. The switch 40 is mounted on a bracket 40', which is mounted on one of the standards 30. When the external die 20 is in its complete downward position, at which time there is maximum pressure on the lock seam 12, the switch 40 will at this instant be closed with the ionization control lead of circuit (Figure 6) 50, causing discharge of the welding current through the electrodes 25. This current will discharge in several high frequency pulses, which will break through a path of least resistance between the electrodes 25, producing the spot weld. This phenomenon has been described in detail in my invention covered in the patents mentioned above.

In the form of the invention disclosed, particularly in Figure 2, there are two pairs of the electrodes 25, one of these pairs being located at one end of the can body 11, and the other at the other end. Each of these pairs of electrodes 25 is associated with a welding circuit substantially as disclosed in Figure 6.

Figure 7:
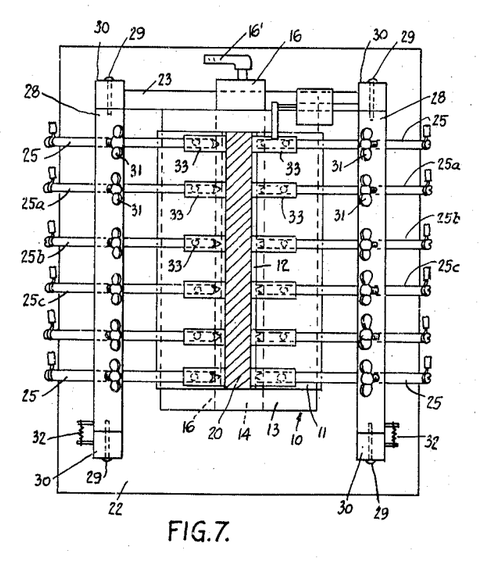
Figure 7 is a horizontal sectional view similar to Figure 2, but illustrating a modified construction.

In Figure 7 a modified form of the invention has been disclosed which is very similar to the prior form, distinguishing merely in the fact that a plurality of pairs of additional electrodes 25a, 25b, 25c, etc., are mounted on the support rods 28 and are for the purpose of spot welding additional points along the lock seam 12 between the ends of the can body.

In other respects this form of the invention is identical to the previous form and like parts are identified by like reference numerals.

The operation of the apparatus for side lock seaming a can body 11 consists in placing the can body 11 upon the internal die 10 when the latter is in a contracted position. The internal die 10 is then expanded to cause the loose lock seam 12 of the can body 11 to become tight. The external die 20 then comes down with suitable pressure upon the seam 12, pressing it into a very tight closed seam. While said external die 20 is in its down position, under full pressure, the can body 11 will be spot welded by said pairs of electrodes 25.

It is pointed out that the external die 20 indirectly forces the electrodes 25 against opposite points of the seam 12. Normally, the springs 32 indirectly urge the electrodes 25 upwards so that their front ends are slightly elevated. The springs 36 within the stem 34 (Figure 5) provide a suitable pressure for the electrodes 25 against the sides of the seam 12. The control screw 53 is so adjusted that when the die 20 is in its completely down position, under full pressure, the switch 40 will be closed against the ionization control lead of current 50, indirectly causing the discharge of welding current through the electrodes 25.

It is particularly pointed out that the spot welding of the side seam 12 of the can body takes place at the instant that the side seam is finished and is still under pressure. For this reason the side seam will be welded into a tightly engaged closed position, so that when the side seam is subsequently soldered in the usual way, the solder will never be called upon to take up all the stress placed on the side seam.

The spot welding of the seam 12 at its ends, and in accordance with the modified form of the invention, shown in Figure 7, between its ends, will so reinforce the side seam 12, that it will not break open or become loosened when the ends of the can are lock seamed on the ends of the can body.

Another important feature of the invention resides in the fact that because the welding electrodes are placed externally of the can body during the welding operation and because of the character of the welding current, the welding current will cut a path along the external surface, that is the skin of the can body and within and through the lock seam or other seam. The welding current will not puncture the lining of the can, nor will excessive heat reach it, as would occur if one of the electrodes were internally of the can body and the other externally, and a low frequency current used. Because the welding current does not burn and cut the lining, the lining will not be deteriorated by the heat to the point where it can be easily attacked by food acids and alkali.

Another important feature of the invention resides in the utilization of a discharge tube as disclosed, or a similar tube or apparatus which makes it possible to use high frequency for the welding operation. With this arrangement it is possible to weld at a low voltage and at high amperage. Thus, it is possible to accomplish the weld with less heat than heretofore, due to the shorter time of discharge of the electric current and the skin path taken by the current.

Another feature of the invention resides in the fact that because the side seam is welded, while it is being held closed by the forming dies it will be more tightly closed than are similar seams. For this reason less solder is needed on the seam, having the advantages already pointed out.

Figure 10:
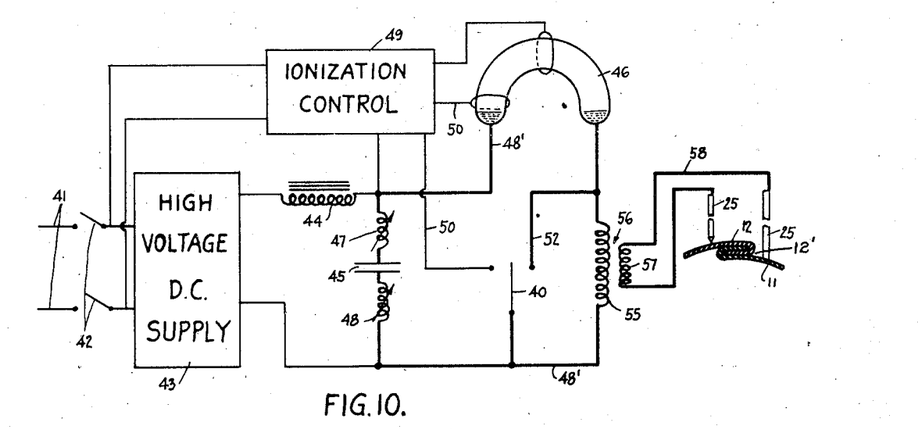
Figure 10 is a schematic wiring diagram of the apparatus shown in the Figures 8 and 9.

In Figures 8 to 10 another form of the invention is disclosed which distinguishes from the prior forms in several respects. The welding electrodes 25 are mounted upon the external die 20 and engage the cam body 11 when the die 20 is in its extreme down or closed position. At this instant the control screw 53 operates the switch 40 for causing the welding current to discharge through the electrodes. The circuit 48' from the discharge tube 46 includes in series the primary 55 of a transformer 56, having a secondary 57 in a secondary circuit 58, which includes said electrodes 25.

In other respects this form of the invention is identical to the previous form and similar parts are identified by like reference numerals.

The specific feature of this form of the invention resides in the fact that the transformer 56 may be so designed that the current flowing in the circuit 58, which includes the electrode 25, is of low or stepped-down voltage and high amperage. With this arrangement it is possible for the seam 12 to be welded without generating much heat, which causes deterioration of the lining of the can.

In Figures 11–14 still another form of the invention is disclosed, which distinguishes from the prior forms in several ways. An important distinction resides in the fact that the welding takes place on the horn 59, which is located past the position at which the lock seam 12 was formed. The can body 11 is advanced from the dies, which form the lock seam to its position on the horn 59. As it reaches a certain position on the horn 59, the can body 10 will depress a normally projecting keeper 60. The keeper 60 is slidable in a recess 61 formed in the horn 59. A spring 62 urges the keeper 60 into an extended position. The outer end of the keeper 60 is formed with an inclined surface 63 against which the edge of the can body 10 engages to cam the keeper 60 inwards. The keeper 60 has an inclined slot 64 upon its inner end, which engages a pin 65, which projects from a slide 66. This slide 66 extends longitudinally of the horn 59 and is in the nature of a shutter controlling the passage of light through an opening 67, formed in the front end of the horn 59.

Figure 11:
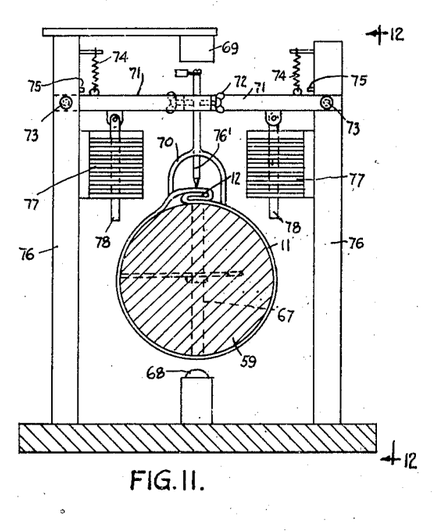
Figure 11 is a fragmentary vertical sectional view of an apparatus for side seaming a can body.
Figure 12:
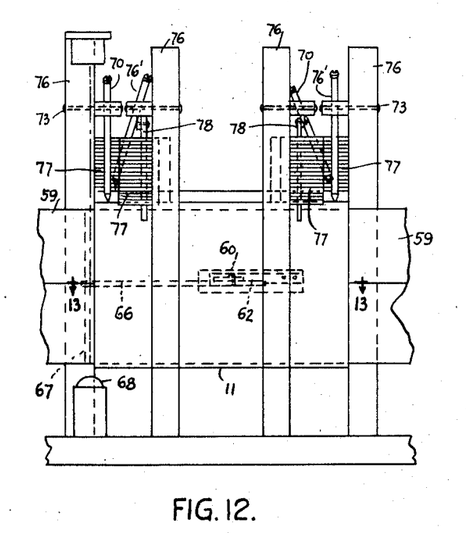
Figure 12 is a fragmentary elevational view looking in the direction of the line 12—12 of Figure 11.
Figure 13:
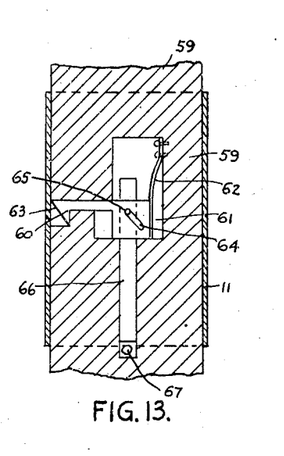
Figure 13 is a fragmentary horizontal sectional view taken on the line 13—13 of Figure 11.

An exciter lamp 68 is aligned with the opening 67 and controls the operation of an electric eye 69. A fork-like welding electrode 70 straddles each end of the seam 12. Each electrode 70 is supported on an arm 71 by a clamp screw 72. Each arm 71 is pivotally mounted on a pintle 73. Each arm 71 is urged into a raised position by a spring 74. Its upward motion is limited by a stop pin 75. Another electrode 76' is provided for each electrode 70 and these electrodes 76' are adjustably mounted on similar arms 71, which are pivotally supported by pintles 73 and which are urged upwards by springs 74. Upward motion is limited by stops 75. The pintles 73 are supported on standards 76. Solenoids 77 are mounted on these standards and are provided with movable cores 78 which are connected with the arms 72.

The electric eye 69 (see Figure 14) is connected in a circuit 80 and controls an auxiliary circuit 81, which includes the coils of the solenoids 77 in series. The auxiliary circuit 81 connects with a circuit 81' controlled by a delayed relay 82, which in turn controls a solenoid 83, having a core 84 connected with the switch 40 for operating said switch 40.

The operation of this form of the invention is as follows:

The can body 11 comes along in the usual way from the position in which the lock seam 12 was hammered closed. Normally, the shutter 66 closes the light passage 67. However, when the can body 11 is over the light passage 67 it depresses the keeper 60, which indirectly causes the shutter 66 to move to an open position, the one illustrated in Figure 13, in which light may now pass through the passage 67. When the can body reaches a proper position on the horn 59, the light from the lamp 68 passes the edge of the can body 11 and passes through the opening 67 and operates the electric eye 69. The electric eye 69 controls energization of the circuit 80 and the solenoids 77. The cores 78 of the solenoids 77 move down and engage the electrodes 70 and 76' against the lock seam portion of the can body 11. An instant later the relay 82 functions to energize the solenoid 83 so that its core 84 throws the switch 40 upon the contact of the ionization circuit 50, causing the discharge tube 46 to discharge the current through the welding circuit 48.

In other respects the reference numerals are the same.

Figures 15, 16, 17:
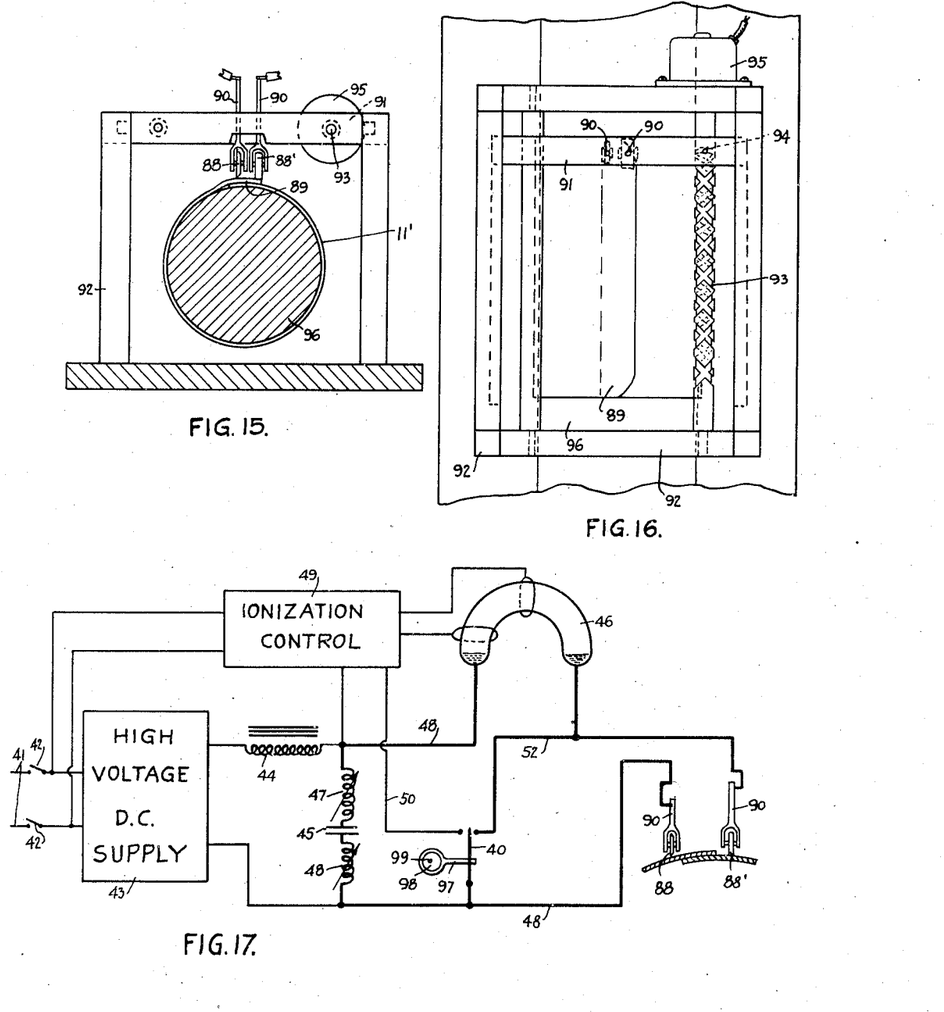
Figure 15 is a transverse vertical sectional view of an apparatus for side seaming a can body, constructed in accordance with still another form of this invention.
Figure 16 is a plan view of the apparatus shown in Figure 15.
Figure 17 is a schematic wiring diagram of the apparatus shown in the Figures 15 and 16.

In Figures 15–17 still another form of the invention has been disclosed which distinguishes from the prior forms in the fact that the welding electrodes 88 and 88' are in the nature of rollers adapted to roll along the sides of the seam 89 of the can body 11'. The electrode 88 is bevelled to be sharp, while the electrode 88' is flat and blunt. This construction will concentrate the heat at the sharp electrode. More specifically, the rollers 88 and 88' are supported on arms 90, which are mounted on a carriage 91. This carriage 91 is slidable in a frame 92. A screw 93 having a thread which continues first in one direction and then in the other direction, is rotatively mounted on said frame 92 and engages a follower pin 94 on the carriage 91 for causing said carriage 91 to reciprocate as the screw 93 turns. An electric motor 95 is connected with and drives the screw 93.

A horn 96 supports the can body 11'. The seam 89 is shown as a simple overlap seam. The electric circuit of the device is substantially identical to the first form of the invention, with the exception that an operator arm 97 connects with the switch 40 and is operated by an eccentric 98 on a driven shaft 99. As the shaft 99 rotates the eccentric 98 will rapidly engage the switch 40 with the contact of the ionization circuit 50 and therefor acts in the nature of an interrupter for the welding current.

The operation of this form of the invention is as follows:

The can body 11' is engaged on the horn 96. The screw-member 93 will cause the carriage 91 to move the length of the body 11'. The roller electrodes 88 and 88' move along the sides of the seam 89. The welding current discharges at a high frequency between the electrodes 88 and 88' and weld points will be disposed across the seam 89.

One advantage of the use of high frequency current in welding the lock seam of a can is that the current travels between the electrode substantially on the outer surface of the can material due to the skin effect. Thus when the electrodes are engaged against the material at the respective marginal exterior surfaces on opposite sides of the external channel or open groove 12' of the seam as in Figure 10, the current will first flow at the innermost crevice of the groove to melt the metal thereat. The surface tension of the molten metal fills the crevice and the current then flows over the surface of the molten metal. Thus the zone of welding moves progressively away from the interior or inside coated surface of the can material. Not only does the movement reduce danger to the coated surface but enables welding to progress outwardly of marginal portions of the channel or groove where there is less leverage on the originally welded portion at the crevice when the can is subjected to internal pressure.

Figures 14, 18, 19, 20:
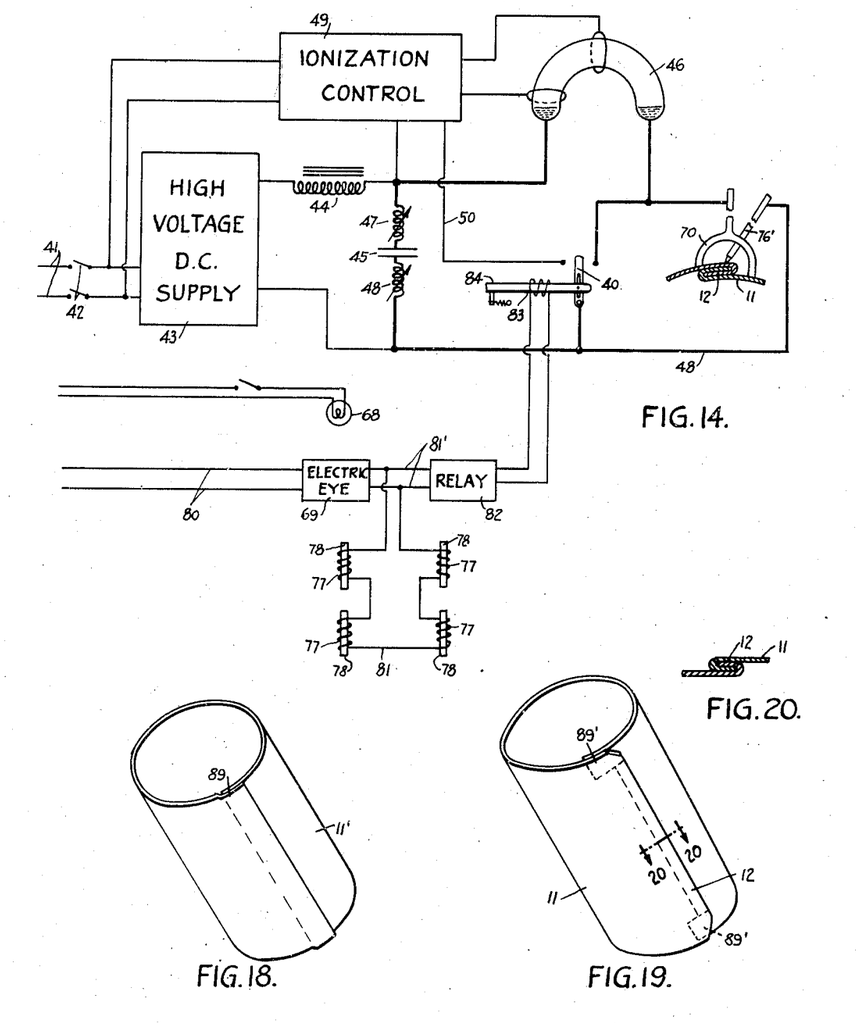
Figure 14 is a schematic wiring diagram of the apparatus shown in the Figures 11 to 13.
Figure 18 is a perspective view of a can body adapted to be welded, in accordance with this invention.
Figure 19 is a perspective view of another can body adapted to be welded in accordance with this invention.
Figure 20 is a fragmentary sectional view taken on the line 20—20 of Figure 19.

In Figure 18 a perspective detail view is shown of the can body 11', having an overlapped side seam 89. In Figures 19 and 20 detail views are shown of a can body 11, having a lock seam 12 along its side, except at its ends where it has small overlapping seams 89', respectively.

It is obvious that slight changes may be made in the form, construction and arrangement of the several parts, as shown, within the scope of the appended claims without departing from the spirit of the invention, and I do not, therefore, wish to limit myself to the exact construction and arrangement shown and described herein.

What I claim as new and desire to secure by Letters Patent of the United States is:

1. A process for making cans comprising forming a lock seam between opposite marginal end portions of a cylindrically bent can blank of weldable material, the seam providing an externally open groove, and passing a high frequency welding current between two close points on opposite sides of the groove and on the exterior surface of the blank.

2. A process for making cans comprising forming a lock seam between smooth opposite marginal end portions of a cylindrically bent can blank of weldable material, the seam providing an externally open groove, and passing a high frequency welding current between two close points on opposite sides of the groove and on the exterior surface of the blank whereby the current is concentrated on the external surface of the blank and will first melt the material at the bottom of the groove and the juncture of said portions and the current will flow on the surface of the molten material to progressively weld material more remote from the original juncture and inner face of the blank and tend to fill the groove, making the outer circumference of the blank uniform to resist rupture of the seam against internal pressure.

3. A process for making cans comprising forming a lock seam from hook-like channel portions at the end portions of opposite margins of a cylindrically bent and otherwise substantially smooth can blank of weldable material, and passing sufficiently high frequency current between two close points on the respective marginal exterior surfaces on opposite sides of the external joint of the seam whereby the high frequency current will travel substantially on the surfaces which join to form an outwardly open fine groove on one side of the seam and melt the material at the junction of the surfaces in the groove and flow along the surface of the molten material and progressively weld the material farther from the interior face of the body.

4. A process for making cans comprising forming a lock seam at the end portions of opposite margins of a cylindrically bent can blank of weldable material, radially expanding the cylinder while an external force is applied normally to the seam to draw the seam tight, the seam providing an exteriorly open groove, and passing a high frequency current between two close points on the respective marginal surfaces on opposite sides of the groove, whereby the high frequency current will travel substantially on the surfaces bounding the groove, to melt the material at the junction of the surfaces in the groove, and the current will flow along the surface of the molten material and progressively weld the material farther from the interior of the body to substantially fill the groove to reduce stresses in the original zone of said junction when the can is subjected to internal pressure.

5. A process for making cans comprising forming a lock seam of hook-like channel portions at the end portions of opposite substantially smooth margins of a cylindrically bent can blank of weldable material, the exterior surface of the outer channel portion and the uncovered exterior marginal surface of the inner channel portion adjacent the outer channel portion meeting to form a groove between said surfaces; and passing sufficient high frequency current between two close points on the respective marginal exterior surfaces on opposite sides of said groove whereby the high frequency current will travel substantially on said first mentioned surface and to melt the material at the juncture of the surfaces in the groove and flow along the surface of the molten material and progressively weld the material farther from the interior face of the body.

6. A process for making cans comprising forming a lock seam consisting of inner and outer interlocked channel portions each at the end portions of opposite margins of a cylindrically bent can blank of weldable material, radially expanding the cylinder while an external force is applied normally to the seam to draw the channel portions of the seam together, the exterior surface of the outer channel portion and the uncovered exterior marginal surface of the inner channel portion adjacent the outer channel portion meeting to form a groove between said surfaces; and immediately passing a high frequency current between two close points on the respective exterior marginal surfaces, whereby the high frequency current will travel substantially on said first mentioned surface and melt the material at the juncture of the surfaces in the groove and flow along the surface of the molten material and progressively weld the material farther from the interior face of the body.

7. A process as claimed in claim 1, the surfaces bounding said groove being substantially smooth.

ALFRED VANG.

REFERENCES CITED

The following references are of record in the file of this patent:

UNITED STATES PATENTS

| Number | Name | Date |
|---|---|---|
| 1,548,204 | Moesta | Aug. 4, 1925 |
| 1,703,541 | Pierson | Feb. 26, 1929 |
| 1,865,530 | Lutz | July 5, 1932 |
| 1,865,531 | Lutz | July 5, 1932 |
| 1,902,469 | Seede | Mar. 21, 1933 |
| 1,944,094 | Mayweg | Jan. 16, 1934 |
| 1,944,096 | Mayweg | Jan. 16, 1934 |
| 2,021,477 | Bohn | Nov. 19, 1935 |
| 2,087,530 | Potchen | July 20, 1937 |
| 2,124,004 | O'Neil | July 19, 1938 |
| 2,137,909 | Hagedorn | Nov. 22, 1938 |
| 2,268,493 | O'Brien | Dec. 30, 1941 |
| 2,287,544 | Vang | June 23, 1942 |
| 2,302,119 | Hagedorn | Nov. 17, 1942 |
| 2,340,680 | Oswald et al. | Feb. 1, 1944 |
| 2,372,147 | White et al. | Mar. 20, 1945 |
| 2,400,921 | Dow et al. | May 28, 1946 |

FOREIGN PATENTS

| Number | Country | Date |
|---|---|---|
| 204,909 | Switzerland | July 1, 1939 |